UNITED STATES PATENT OFFICE.

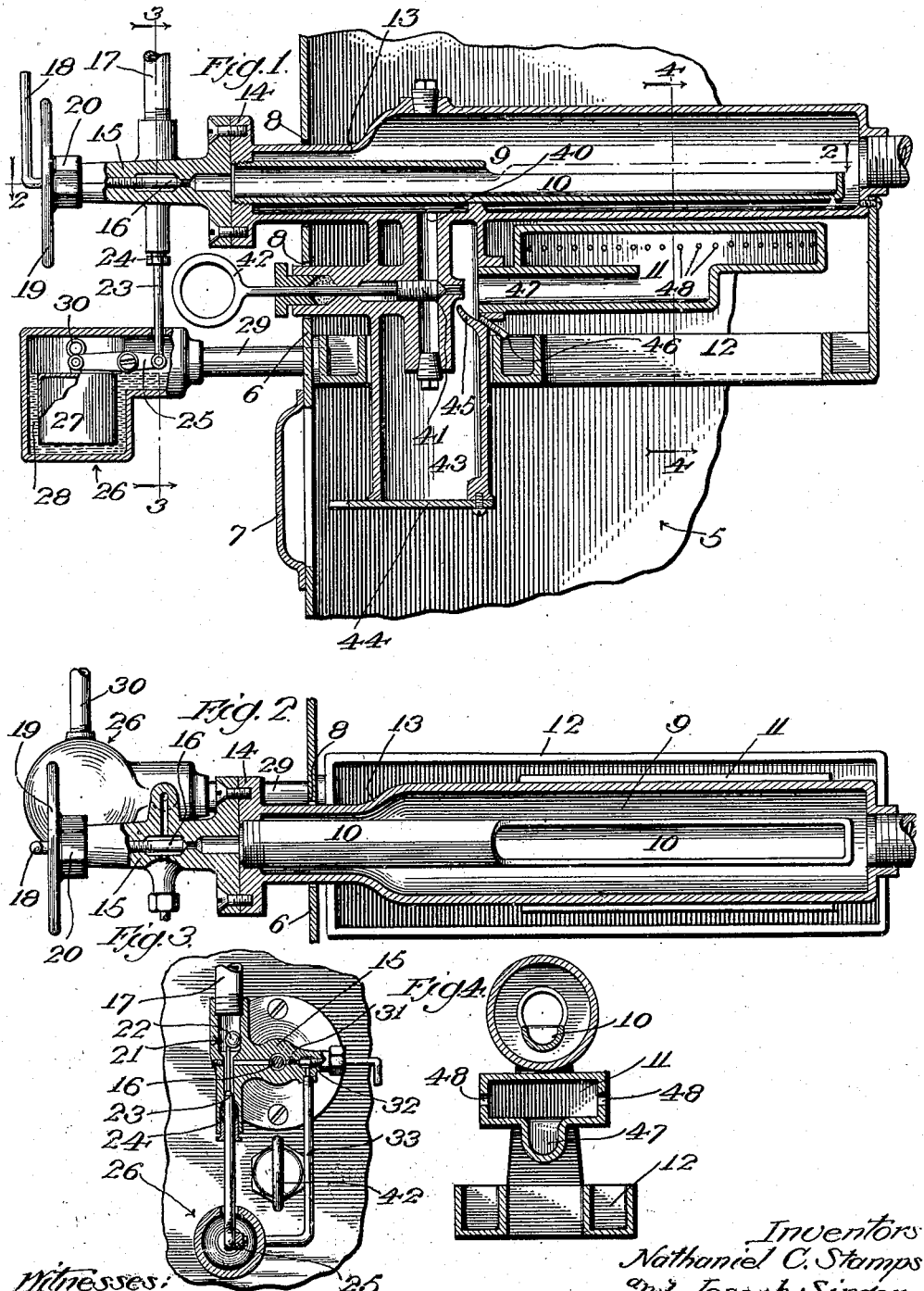

NATHANIEL C. STAMPS AND JOSEPH SINGER, OF LOS ANGELES, CALIFORNIA.

HYDROCARBON-BURNER.

No. 924,012.  Specification of Letters Patent.  Patented June 8, 1909.

Application filed February 6, 1908. Serial No. 414,536.

*To all whom it may concern:*

Be it known that we, NATHANIEL C. STAMPS and JOSEPH SINGER, citizens of the United States, residing at Los Angeles, in the county of Los Angeles and State of California, have invented new and useful Improvements in Hydrocarbon-Burners, of which the following is a specification.

This invention relates to a hydro-carbon burner of that class which utilize a generating chamber for vaporizing the liquid hydro-carbons which are fed to the burner, and it consists in the combination with such a burner of a starting pan placed beneath the same and of an automatic device to cut off the flow of fuel to the burner and to the starting pan when the starting pan is filled sufficiently.

The invention further consists in the arrangement and construction of the air inlet tubes and mixing tubes so that the vapors are thoroughly mixed with air in the proper proportions for combustion.

We accomplish the above by means of the device described herein and illustrated in the accompanying drawings, in which:—

Figure 1,— is a vertical longitudinal section of the burner in place in the fire box of a stove. Fig. 2,— is a horizontal section taken on line 2—2 of Fig. 1. Fig. 3,— is a vertical cross section taken on line 3—3 of Fig. 1. Fig. 4,— is a vertical cross section taken on line 4—4 of Fig. 1.

Referring to the drawings 5 designates a stove fire box of any preferred construction whose front wall 6 is provided with a door 7, which door is approximately in the position of the usual ash pit door. Openings 8 are cut in wall 6 through which the burner projects into the fire box. The burner comprises a vaporizing chamber 9 which contains a vaporizing pan 10, a mixing and burner chamber 11 and a starting pan 12 being located beneath vaporizing chamber 9. Chamber 9 is contracted as at 13 and passes outwardly through the front wall of the fire box, being provided with a flange 14 on its outer end. Vaporizing pan 10 is preferably constructed of a short length of pipe whose forward end is screwed into flange 14 and whose rear or inner end is cut away as shown in Figs. 1 and 2 to form a pan from which the vapors of the liquid hydro-carbons may escape. Secured to flange 14 is a casting 15 which contains a needle valve 16 controlling the flow of oil from supply pipe 17 to vaporizing pan 10. This valve is controlled by means of a handle 18, which may be moved over a dial 19 secured to stuffing box 20 of the valve, and the amount of liquid flowing into the vaporizing pan is regulated thereby. A ball valve 21 controlled by a ball stopper 22 is adapted to automatically close the passage between supply pipe 17 and needle valve 16 when left undisturbed. Immediately beneath this ball a vertically movable rod 23 projects upwardly into casting 15 through a stuffing box 24, the lower end of this rod being pivotally secured to a pivoted lever 25 housed within a float chamber 26. The other end of pivoted lever 25 is connected to a float 27 which is adapted to be raised or lowered by the increasing or decreasing amount of liquid 28 within chamber 26. Chamber 26 is directly connected to starting pan 12 by a pipe 29 and is provided with an overflow pipe 30 which leads to any convenient receptacle or reservoir. Casting 15 is further provided with a bypass 31 which leads from behind valve 16 and is controlled by a small valve 32 which connects with a small pipe 33 leading to float chamber 26. By opening this valve it will be seen that the liquid from supply pipe 17 may be admitted to the float chamber and to starting pan 12. Both will fill with liquid until the same reaches such a level as to overflow through pipe 30. However, when the liquid has reached this level, float 27 will be raised and rod 23 will thereby be depressed, allowing ball 22 to seat itself and thus cut off the supply of fuel to the whole burner.

Vaporizing chamber 9 is provided with a downwardly opening outlet 40 which leads from a point on its lower side and near its front end within the fire box. This opening leads to a needle valve 41 controlled by a handle 42 which projects out of the fire box as shown in Fig. 1. The entire inner end of the needle valve is surrounded by an air chamber inclosed in a vertical cylindrical casing 43 whose lower end is provided with a pivoted damper 44 adapted to control the entrance of air thereto. This damper may be regulated by opening door 7, but the door is ordinarily kept closed during the operation of the burner, the air which is used coming through the grate bars in the usual manner. Immediately under the discharge point of needle valve 41 a lip 45 is provided on casing 43 to catch any liquid which may pass from the end of the needle valve. A small tube 46 leading from the pocket formed by lip 45 is adapted to convey any liquid to starting pan 12. Immediately opposite the discharge point of needle valve 41 casing 43 is provided with an opening into which mixing tube 47 is placed, the vapors from the needle valve being discharged directly into this mixing tube. In passing through the space between the needle valve and the mixing tube the vapors draw after them a supply of air from the air chamber with which they are thoroughly mixed during their passage through the mixing tube. A mixing and burner chamber 11 is provided on the end of mixing tube 47, this chamber being immediately underneath vaporizing chamber 9 and being provided with outlet burner holes 48 on its sides so that the mixed and combustible vapors are discharged horizontally beneath the vaporizing chamber. Upon being ignited the flame from these vapors does not play directly upon the vaporizing chamber but passes around it, thus keeping it at a sufficiently high temperature for vaporizing purposes without any danger of explosion.

From the foregoing it will be seen that we have provided a mechanism which will automatically cut off the fuel supply to the burner if the fire should happen to become extinguished. In this case it will be seen that the vaporizing chamber will immediately become cooled and the liquid hydro-carbons passing into the same will not be vaporized but will overflow from pan 10 and pass down outlet 40 and through valve 41. The liquid will then pass through tube 46 into starting pan 12 and fill the pan and chamber 26 to the level of overflow 30 or until float 27 has risen sufficiently to allow ball 22 to close valve 21 and thus shut off the fuel supply to the whole burner. If any surplus liquid passes into the pan it immediately passes out through overflow 30 and does not flood the burner. Thus if the fire should be extinguished the fuel is not allowed to run out of the burner and waste. This same operation takes place if dirty fuel is used and the needle valves do not close properly, and if the ball valve should also fail to close for this reason the overflow passes off through pipe 30 to a convenient receptacle. In starting this burner valve 32 is opened to allow starting pan 12 to fill with liquid fuel until valve 21 is closed by the action of float 27. The fuel within the starting pan is then ignited, valve 32 having been closed. As the fuel in the starting pan is gradually consumed valve 21 opens and allows the passage of fuel to valve 16 which may then be opened to supply fuel to the vaporizing chamber. The liquid is then vaporized in the hot chamber and passes through needle valve 41 and out through burner chamber 11 where it is ignited by the flame from the fuel in pan 12. Thus it will be seen that it is impossible to supply fuel to the vaporizing chamber before the fuel in the starting pan has been burning for some time so as to thoroughly heat the vaporizing chamber and prevent all possibility of any fuel fed thereto not being vaporized.

By means of the placement of the vapor discharge within the air feed chamber so as to be completely surrounded by the same, the mixture of the vapors with the air is more perfectly accomplished and the resultant flame is a more perfect combustion of the fuel. By the placement and construction of the burner chamber the flame is thrown away from the vaporizing chamber so as to not heat the same to a temperature which is too high and thus cause explosions besides wasting a large amount of heat unnecessarily upon the vaporizing chamber.

Having described our invention what we claim as new and desire to secure by Letters Patent is:—

1. A hydro-carbon burner, comprising a vaporizing chamber, a starting pan beneath said chamber, fuel supply means for said chamber, fuel supply means for said starting pan, fluid connecting means between said chamber and said pan, and a buoyant means to automatically cut off the fuel supply to both the pan and chamber when the liquid in the pan reaches a predetermined level.

2. A device of the class described, comprising a hydro-carbon burner, a starting pan for said burner beneath the same, fuel supply means for said burner, fuel connective means between said burner and said pan, auxiliary fuel supply means for said starting pan, a chamber connected with said pan, said chamber being provided with an overflow, a float in said chamber, and a valve controlling the fuel supply to said burner and pan, said valve being operatively connected with said float.

3. A hydro-carbon burner, comprising a vaporizing chamber, a mixing chamber below said vaporizing chamber, a vapor outlet for said last named chamber discharging into said mixing chamber, a starting pan below said mixing chamber, a liquid drain leading from beneath the discharge of said vapor outlet to said pan, means to feed liquid fuel to said vaporizing chamber, and automatic means to cut off the fuel feed supply when the liquid in said pan reaches a predetermined level.

4. A hydro-carbon burner, comprising a vaporizing chamber, a mixing chamber below said vaporizing chamber, a vapor outlet for said last named chamber discharging into said mixing chamber, a starting pan below said mixing chamber, a liquid drain leading from beneath the discharge of said vapor outlet to said pan, means to feed liquid fuel to said vaporizing chamber, a valve controlling the fuel feed, and float means connected with said starting pan, said float means operatively connected to said valve.

5. A hydro-carbon burner, comprising a vaporizing chamber, a mixing chamber below said vaporizing chamber, a vapor outlet for said last named chamber discharging into said mixing chamber, a starting pan below said mixing chamber, a liquid drain leading from beneath the discharge of said vapor outlet to said pan, means to feed liquid fuel to said vaporizing chamber, auxiliary means to feed fuel to said starting pan, a valve controlling the fuel feed to both said vaporizing chamber and pan, and float means connected to said starting pan, said float means operatively connected to said valve.

6. A hydro-carbon burner, comprising a vaporizing chamber, a mixing chamber below said vaporizing chamber, an air chamber adjacent said mixing chamber, a vapor outlet for said vaporizing chamber extending into said air chamber and discharging into said mixing chamber, a starting pan below said mixing chamber, a liquid drain leading from beneath the discharge of said vapor outlet to said pan, means to feed liquid fuel to said vaporizing chamber, and automatic means to cut off the fuel feed when the liquid in said pan reaches a predetermined level.

7. A device of the class described, comprising a hydro-carbon burner, fuel supply means for said burner, a starting pan beneath said burner, fuel supply means for said starting pan independent from the fuel supply means for said burner, and an automatic buoyant means to cut off the supply of fuel to the burner when the liquid in the starting pan reaches a predetermined level.

In witness that we claim the foregoing we have hereunto subscribed our names this 28th day of January, 1908.

N. C. STAMPS.
JOSEPH SINGER.

Witnesses:
   EDMUND A. STRAUSE,
   OLLIE PALMER.